US007050182B2

(12) United States Patent
Meyer

(10) Patent No.: US 7,050,182 B2
(45) Date of Patent: May 23, 2006

(54) DEVICE HAVING EMBEDDED SUPPLY CONSUMPTION RATE TEST CAPABILITY

(75) Inventor: Brenton L. Meyer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 839 days.

(21) Appl. No.: 09/823,834

(22) Filed: Mar. 29, 2001

(65) Prior Publication Data

US 2002/0140977 A1 Oct. 3, 2002

(51) Int. Cl.

*G06F 15/00* (2006.01)
*H04N 1/00* (2006.01)
*G03G 15/00* (2006.01)

(52) U.S. Cl. .................... 358/1.13; 358/1.16; 358/406; 399/24; 399/25; 399/26; 399/27

(58) Field of Classification Search ................. 358/1.4, 358/1.8, 1.9, 1.15, 406, 1.13, 1.16; 399/24–30
See application file for complete search history.

(56) References Cited

U.S. PATENT DOCUMENTS

| | | | | |
|---|---|---|---|---|
| 5,459,556 | A | 10/1995 | Acquaviva et al. | |
| 5,771,420 | A * | 6/1998 | Suzuki et al. | 399/25 |
| 5,937,225 | A * | 8/1999 | Samuels | 399/27 |
| 6,034,788 | A * | 3/2000 | Sasanuma et al. | 358/406 |
| 6,226,419 | B1 * | 5/2001 | Lodwick et al. | 382/294 |
| 6,348,975 | B1 * | 2/2002 | Tsunekawa et al. | 358/1.17 |

FOREIGN PATENT DOCUMENTS

| | | |
|---|---|---|
| JP | 09069035 | 3/1997 |

* cited by examiner

*Primary Examiner*—Edward Coles
*Assistant Examiner*—Chan S. Park

(57) ABSTRACT

A printer having an embedded marking agent yield test capability has a formatter, a control panel, a print engine module, and a memory module. The memory module stores a data file for printing a standard marking agent test page, and is linked to the control panel. The memory module is further linked to the print engine module via a linkage that bypasses the formatter. Standardized marking agent test pages can thereby be printed directly from the printer control panel while bypassing the formatter. This removes uncertainties and inconsistencies that were associated with marking agent testing of the prior art.

7 Claims, 3 Drawing Sheets

DEVICE HAVING EMBEDDED SUPPLY CONSUMPTION RATE TEST CAPABILITY

FIELD OF THE INVENTION

The present invention is related to the field of testing supply yields for devices that consume supplies in producing output, and more particularly to devices that have an embedded capability to perform a standard supply consumption rate test.

BACKGROUND OF THE INVENTION

Manufacturers of devices often provide performance data for the devices. In particular, manufacturers of devices that consume supplies in producing output often provide data regarding rates of consumption of the consumables so that consumers can estimate operating costs for the devices. As an example, an automobile manufacturer may provide estimated miles per gallon ratings for fuel consumed by a car model so that a consumer can estimate fuel costs that will be associated with the car. The estimated miles per gallon ratings are obtained by the manufacturer through testing of the automobiles. The resultant ratings are dependent on the test conditions, and will likely be different for each individual automobile purchaser depending on their driving habits and conditions under which they drive.

Industries other that the auto industry also provide rates of supply consumption for producing output. As an example, a manufacturer of printers may provide an estimated cost per page, or "CPP" for operation of a given printer. This CPP rate is in large part a function of the marking agent consumed per page. Like the automobile manufacturer, the printer manufacturer determines this rate through internal testing.

Internal testing typically comprises the printing of a test page with a number of characters and/or images thereon. The test page is printed a multiplicity of times until a marking agent is expired. A marking agent consumption rate can then be determined by dividing the amount of marking agent consumed by the pages printed. The marking agent consumption rate is reported to users, often in the form of a CPP. For many business users of printers, these CPP rates are of critical importance as the business requires accurate cost accounting.

The reported marking agent consumption rate will of course correspond to the test page used by the manufacturer. That is, the consumption rate will depend on the marking agent coverage on the test page. Thus, actual consumption rates for consumers will vary from the reported rate depending on the consumer's actual usage conditions. In particular, the software application used to create the test page printed will affect the amount of marking agent coverage. As an example, a test page created using a word processor such as MS Word will likely consume a different amount of marking agent than a textually identical page created using a different word processor, such as WordPerfect. This is due to the formatting process the printer uses to transform an incoming print job data file into an image for printing.

This can be further illustrated by reference to the schematic diagram of the general printing process shown in FIG. 1. A user may create a page using an application on his computer 2, which may be, for example, a document made using Word. This page in the form of a print job data file 4 is then transmitted to the printer 6 for printing. When received by the printer 6, the file goes through a formatter 8. The formatter 8 generally comprises a software utility that transforms data files created by applications into files that the printer engine 10 can interpret for printing. Accordingly, the formatted data file is transmitted from the formatter 8 to the print engine module 10 for printing. The print engine module 10 may be generally thought of as the set of mechanical, processor, and controller components that accept an input formatted print job data file from the formatter and deposits corresponding images on a sheet of paper. The end result is a printed page 12.

The formatter 8 responds differently to different software applications. For example, for a textually identical page created using Word and created using WordPerfect, the formatter 8 very likely will cause different levels of marking agent to be used in printing the respective pages. This problem is most acute for color images, where the formatter must determine what hue, brightness, contrast, etc., to give an image. Additionally, applications for producing and processing color images may contribute further uncertainty to marking agent consumption levels.

As an example, assume a single color image file is imported into two different software applications. Without directing that any changes be made to the image, the two applications then are directed to produce a printed page of the image. Regardless of the changes introduced by the formatter, the printed images will likely be slightly different and consume different amounts of marking agent due to different proprietary processes that the software applications use to import and process the original image.

These conditions have resulted in numerous unresolved problems in the art. For printer consumers it is impossible to determine what particular test page patterns or what software application was used to create the manufacturer's test page. It is therefore impossible for printer consumers to determine whether they may expect higher or lower marking agent consumption rates than those published. There is also no practical way for a consumer to compare marking agent consumption rates between different manufacturers, or to confirm a manufacturer's published marking agent consumption rate.

Still another problem is related to consumers' ability to test their device's supply consumption rates over the life of a device. A printer's marking agent consumption rate may deteriorate as components become worn and less efficient. While a printer purchaser can determine a marking agent consumption rate of their own by printing a known number of pages with a known amount of marking agent, there is no way to accurately compare this self-determined rate to the manufacturer's published rates. There is thus no way for a consumer to determine if or by how much their marking agent consumption has changed since purchase of the printer.

Problems in the art likewise exist for manufacturers of printers. Because marking agent consumption is dependent on the formatter, printer manufacturers face the difficult and expensive task of having to retest printers every time a new formatter is introduced. Testing records and procedures must be documented and maintained by the manufacturer regarding marking rate yield tests.

These and other problems remain unresolved; and there is thus a need in the art for a method for determining consumable consumption rate data for devices.

SUMMARY OF THE INVENTION

The present invention generally comprises a device having an embedded supply consumption rate test capability. The device comprises an operating interface that is linked to a memory module with an instruction set stored thereon for producing a standard unit of output. The memory module is in turn linked to a device engine module that produces output. In this manner a user may direct from the device operating interface that the standard unit of output be produced, whereby a standard supply consumption rate can be determined by dividing the standard output produced by the amount of supply it took to produce the output. In a preferred embodiment of the invention, the device comprises a printer, the instruction set for producing a standard unit of output comprises a marking agent test page data file, and the standard unit of output comprises a marking agent test page. The preferred printer embodiment of the invention also comprises an operable linkage between the memory module and the print engine module that bypasses the formatter.

The preferred printer embodiment thereby allows for production of a standard marking agent test page directly from the printer whenever desired and without processing by the formatter. Because no interface with the formatter occurs, the test page will not be subject to differences introduced through formatting and is therefore universally standard. Through practice of the preferred invention embodiment, a universally standard marking agent consumption rate can thereby be determined. Manufacturers no longer have to re-test consumption rates with each new formatter version. Consumers can compare with certainty printer performance over the life of the printer to manufacturer published consumption rates.

In addition to the device of the invention, it will be appreciated that the present invention may well be practiced in the form of a computer program product. In particular, an embodiment of the present invention comprises a computer program product for causing a printer to produce a standard marking agent test page. It will be appreciated that the computer program product of the invention, like the device embodiment discussed above, solves a multitude of heretofore-unresolved problems in the art.

The above brief description sets forth rather broadly the more important features of the present disclosure so that the detailed description that follows may be better understood, and so that the present contributions to the art may be better appreciated. There are, of course, additional features of the disclosure that will be discussed hereinafter which will further describe the subject matter of the invention. In this respect, before explaining an embodiment of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

Figure 1:
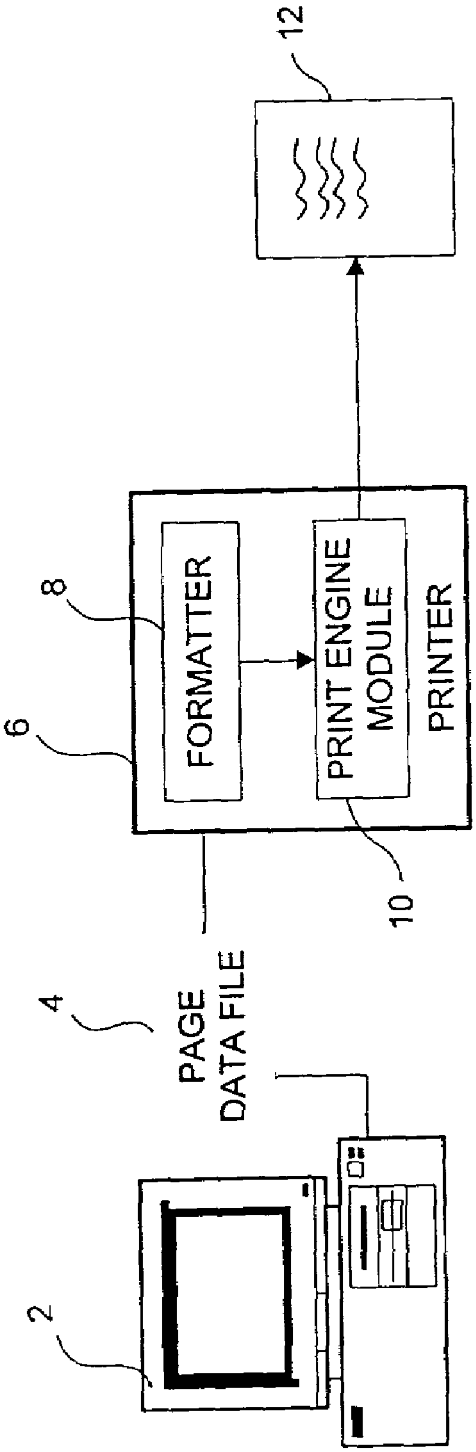
FIG. 1 Prior Art
FIG. 1 is a schematic of a printer and computer of the prior art.
Figure 2:
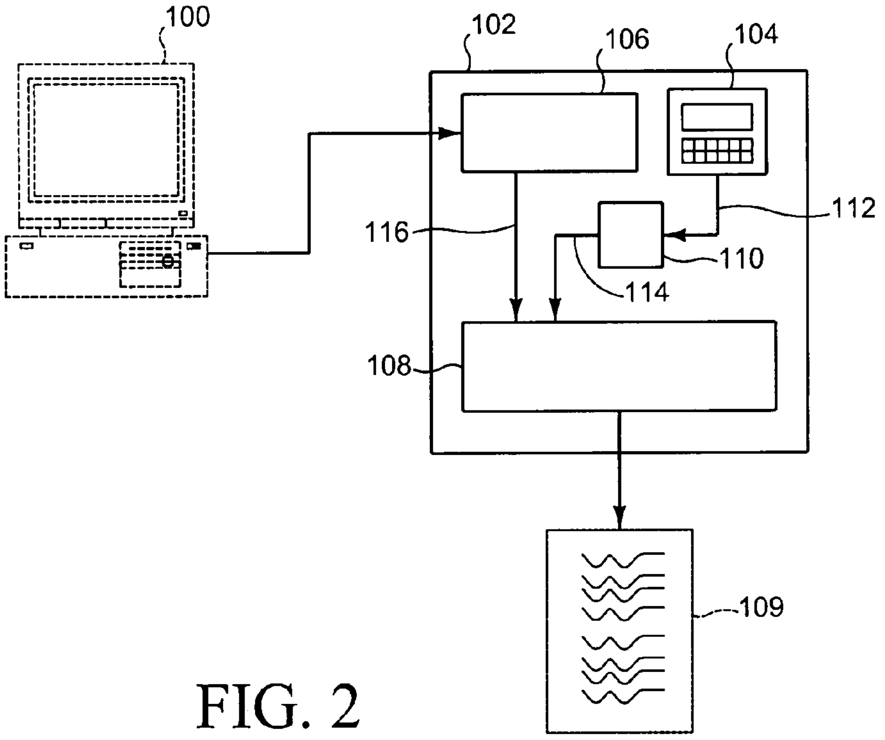
FIG. 2 is a schematic of a computer (shown in dashed) and an embodiment of a printer of the invention.

Turning now to the drawings, FIG. 2 is a schematic of a computer 100 (shown in dashed) connected to an embodiment of a printer 102 of the invention. The printer 102 comprises a user accessible control panel 104, a formatter 106, a print engine module 108, and a memory module 110. The formatter 106 is for "formatting" incoming print job data files from computer 100 for printing by the print engine module 108. The print engine module 108 generally comprises the components that take the formatted print job data file and turn it into a printed page 109 (shown in dashed). The formatter 106 is linked to the print engine module 108 via the linkage 116.

It will be understood that as used herein the terms "linkage" and "linked" are intended to refer to an operable connection capable of delivering a signal that may be electrical, optical, analog, digital, or any of a multiplicity of like formats. Examples of "linkages" may comprise wiring, circuitry, or the like. Additionally, a "linkage" as used herein does not require physical connection; a linkage as used herein may comprise a wireless connection.

The user accessible control panel 104 has a plurality of controls for operating the printer 102, with at least one of the controls comprising a marking agent test page control. The term "control" as used herein is intended to refer to a user selectable instruction. By way of example, the control panel 104 may comprise a display screen with a plurality of buttons, the buttons being able to be manipulated to display various commands on the display screen and to select desired ones of the various commands. In this example a "control" as used herein would comprise selection of a command. The control panel 104 may of course comprise a number of other forms, including but not limited to a touch screen.

The memory module 110 is linked to at least the marking agent test page control within the control panel 104 by the linkage 112. It will be appreciated that the linkage 112 may be direct or may pass through other components (not illustrated). The memory module 110 has instructions stored therein for printing at least one marking agent test page 109, with the instructions generally comprising a data file that does not require processing by the formatter 106 for printing the test page 109.

Most preferably, the memory module 110 is linked by the linkage 112 to a first marking agent test page control and to a second marking agent test page control within the control panel 104, and further contains a first and a second test page data file comprising instructions for printing of first and second marking agent test pages, respectively. The first test page comprises a page having only black images thereon for testing the black marking agent yield, while the second test page has at least a color image thereon for testing the color marking agent yield. In this manner a user may select the first marking agent test page control from the control panel 104 to print the first test page to determine black marking agent yield, and/or may select the second marking agent test page control from the control panel 104 to print the second test page to determine color marking agent yield.

In addition, a plurality of marking agent test pages may be comprised beyond a black image test page and a color image test page. The method of the invention may comprise a marking agent test page configured for each particular paper size that can be used by the printer. By way of example, different black image test page data files may be used for 8½"×11" paper, for legal size paper, for A4 size paper, and for all other sized paper that the printer uses. Different color test page data files could of course likewise be comprised for all paper sizes. Printing of test pages using each of these different data files would require selection of different controls from the control panel 104.

It is noted that as used herein, the term "marking agent" is intended to refer to materials used to mark a substrate with characters or images. By way of example and not limitation, a marking agent may comprise toner or ink. It is also noted that as used herein the term "data file" is not intended to have any particular meaning other than a set of data. Thus, for instance, a "test page data file" as used herein may comprise a set of data for producing images on a substrate.

The memory module 110 may comprise any of a multiplicity of mediums capable of storing a data set thereon. By way of example and not limitation, the memory module 110 may comprise a chip with an integrated circuit thereon, a subset of circuitry in a larger circuitry set that performs additional functions, a set of program instructions stored in a memory medium, or the like. Likewise, it will be appreciated that the memory module 110 may be physically located at a multiplicity of locations within the printer 102. The module 110 may for example be a sub-component of the control panel 104, or may be a sub-component of a print engine controller within the engine module 108. The module 110 may also comprise circuitry embedded within the circuitry of another component, such as the control panel 104 or the engine module 108 controller (not illustrated).

As a further example, the memory module 110 may comprise a subcomponent, such as a sub-circuit or chipset, of the formatter 106. In this embodiment, the memory module 110 will remain linked to the control panel 104 and will remain linked to the print engine module 108 via a linkage that bypasses the formatter 106. Additionally, the memory module 110 may comprise a sub-component of the control panel 104 or a sub-component of the print engine module 108.

It is further noted that the printer 102 of the invention may of course comprise additional components and linkages than those illustrated in FIG. 2. As an example, it is likely that the control panel 104 has a linkage to the formatter 106, and to the print engine module 108. These additional components and linkages are not illustrated or discussed herein as they are not required for understanding the present invention.

What is important for the printer of the invention is that the memory module 110 maintains a linkage 112 with the test page control on the control panel 104, and a linkage 114 with the print engine module 108 that bypasses the formatter 106. This linkage 114 allows for standard test pages to be printed directly from the printer 102 without formatting by the formatter 106. Thus, problems of the prior art regarding uncertainty and inconsistencies between test pages created using different software applications are resolved. The preferred printer of the invention thereby presents for the first time a printer with an embedded capability to produce a standard marking agent test page.

It is noted that the linkage 114 operably connecting the memory module 110 and the print engine module 108 may be direct or indirect, so long as it bypasses formatter 106. That is, although not illustrated in FIG. 2, components may be "in-line" between the memory module 110 and the print engine module 108 so long as the test page data file passes from the memory module 110 to the print engine module 108 without processing by the formatter 106.

It will be appreciated that the printer of the invention allows for generally straightforward determination of a marking agent yield. Using the preferred printer of the invention as illustrated in FIG. 2, a user may direct that a marking agent test page 109 be printed from the control panel 104 and measure the marking agent used in producing the test page 109. Often, a multiplicity of test pages 109 must be printed before an appreciable and accurately measureable amount of consumed marking agent can be determined. Therefore, the preferred printer of the invention may further comprise a command and instruction set for printing a desired multiplicity of test pages 109. Additionally, the printer may desirably provide for reporting of marking agent used in printing one or more test pages 109, and may even report a marking agent yield rate that has been internally calculated.

An additional embodiment of the present invention further comprises a computer program product for causing a printer to print a marking agent test page using the steps as generally described herein with regards to the method of the invention. In particular, an additional embodiment of the present invention comprises a printer having a computer program product contained therein. This embodiment of the printer of the invention is configured in much the same manner as the printer 102 of FIG. 2, and can generally be described, save for the computer program product contained therein, by reference to the elements of that FIG.

Accordingly, a preferred printer of the invention comprises a printer 102 having an embedded marking agent consumption rate test capability; the printer 102 comprising: a user accessible control panel 104 having a plurality of controls for controlling the printer 102; a print engine module 108 for producing a printed page 109 from a formatted data file; a formatter 106 linked by linkage 116 to the print engine module 108; the formatter 106 for formatting incoming unformatted print data files and directing formatted print data files to the print engine module 108 for printing; a memory module 110 linked by a linkage 114 to the print engine module 108 that bypassed the formatter 106; the memory module 110 linked by a linkage 112 to at least one marking agent test page control within the user accessible control panel 104; and a computer program product linked to the memory module 110.

The preferred computer program product element of the printer 102 comprises computer executable instructions embedded in a computer readable medium in the printer 102. It has been discovered that an advantageous printer configuration will have the computer program product and the memory module 110 comprising sub-components of a controller for the printer engine module 108 controller. By way of example, the computer program product and the memory module 110 may comprise circuitry or the like on a controller chipset.

Figure 3:
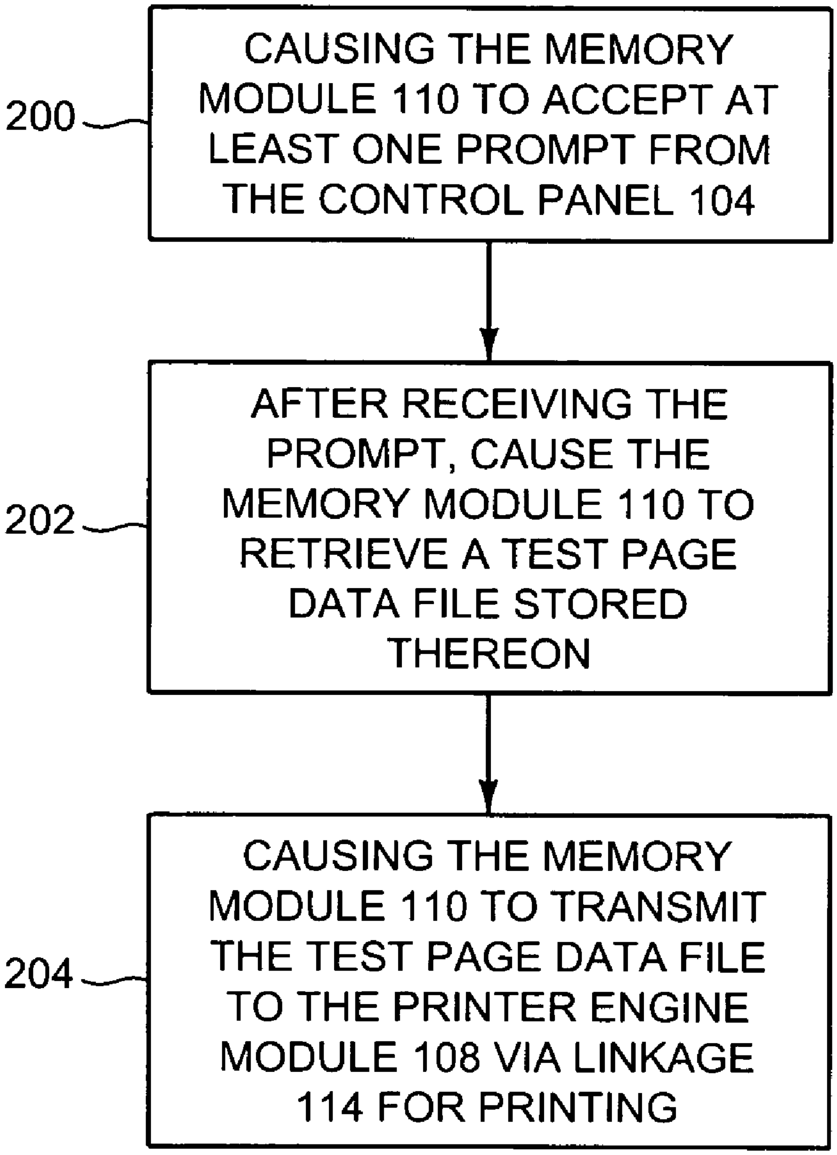
FIG. 3 is a flowchart illustrating steps of an embodiment of a computer program product of the invention.

The preferred computer program product element may best be described by reference to the flowchart of FIG. 3. The program product first causes the memory module 110 to accept at least a first prompt from a first marking agent test page control within control panel control (block 200). After receiving the prompt, the program product causes the memory module 110 to retrieve a first test page data file stored thereon (block 202). This first test page data file comprises instructions for printing a first marking agent test page. In a subsequent step this data file is then transmitted to the print engine module 108 for printing of a test page via linkage 114 (block 204).

More preferably, the computer program product of the invention will comprise executable instructions for printing two marking agent test pages; with the first test page comprising black characters and a second test page comprising at least an image, and particularly a color image if the printer is a color printer. In this more preferred program product element embodiment, the program product will cause the memory module 110 of FIG. 2 to accept two separate prompts from the control panel 104. In addition to the first prompt for printing of the first test page, it will cause the memory module 110 to accept a second prompt from a second test page control within control panel 104 for printing of the second test page. This more preferred computer program product element will further comprise executable instructions for causing the memory module 110 to send the first test page data file to the print engine 108 for printing after receipt of the first prompt, and instructions for sending the second test page to the print engine 108 for printing after receipt of the second prompt. Both transmissions will occur via a linkage such as the linkage 114 that bypasses the formatter 106.

It will be appreciated that the term "computer" as used herein is intended to refer to any device capable of processing instructions, and is therefore not limited to personal computers, mainframes, and the like. By way of example, "computer" as used herein may comprise controllers, chip sets, and processor based modules. Further, the term "computer readable medium" as used herein refers to any of a multiplicity of mediums capable of storing computer readable instructions. By way of example and not limitation, computer readable mediums may comprise magnetic storage media, optically readable media, flash RAM media, VRAM media, circuitry, integrated circuitry embedded on a chip or card or other medium, and the like.

The various embodiments of the device and computer program of the invention thereby solve many of the heretofore-unresolved problems in the art, including those discussed herein above. In particular, a standard marking agent test page can be printed with the preferred printer of the invention. Unlike marking agent test pages of the prior art, the standard printed test page of the present invention will not vary depending on what software application was used to prepare it. Additionally, consumers may print the same test page that was used by the manufacturer, and thereby have the ability to confirm manufacturer published marking agent consumption rates and to track marking agent consumption rates over the life of the printer. Consumers may visually examine the standard marking agent test page to determine if they may expect greater or lesser marking agent yield based on their typical printed pages. Further, through practice of the present invention consumers will for the first time have a standard unit of measure with which to compare printer marking agent consumption rates between different printer manufacturers.

The advantages of the disclosed invention are thus attained in an economical, practical, and facile manner. While preferred embodiments and example configurations have been shown and described, it is to be understood that various further modifications and additional configurations will be apparent to those skilled in the art. By way of example, it will be apparent to those knowledgeable in the art that although a preferred invention embodiment comprises a printer as described herein, the invention as claimed may be practiced with a wide variety of devices that consume a supply to produce output. It is intended that the specific embodiments and configurations herein disclosed are illustrative of the preferred and best modes for practicing the invention, and should not be interpreted as limitations on the scope of the invention as defined by the appended claims.

Various features of the invention are set forth in the appended claims.

What is claimed is:

1. A printer having an embedded marking agent consumption rate test capability, the printer comprising:

a user accessible control panel having a plurality of controls for controlling the printer, said plurality of controls comprising at least a first marking agent test page control;

a print engine module for producing a printed page from a formatted data file;

a formatter linked to said print engine module, said formatter for formatting incoming unformatted print data files and transmitting said formatted print data files to said print engine module for printing;

a memory module linked to said print engine module with a linkage that bypasses said formatter, said memory module storing at least a first marking agent test page data file, said first marking agent test page data file comprising instructions for printing a marking agent test page, said memory module linked to said first marking agent test page control whereby selection of said first marking agent test page control will cause said memory module to print said first marking agent test page; and whereby the marking agent consumption rate may be determined by measuring the marking agent consumed in producing said first marking agent test page.

2. A printer as defined by claim 1 wherein:

said memory module further storing a second test page data file, said first test page data file comprising data for printing a first test page comprising a plurality of black characters, and said second test page data file comprising data for printing a second test page comprising at least a color image;

said plurality of controls further comprising a second marking agent test page control; and said memory module is linked to said second marking agent test page control, whereby selection of said second marking agent test page control will cause said memory module to transmit said second marking agent test page data file to said print engine module for printing of said second marking agent test page.

3. A printer as defined by claim 1 wherein said memory module comprises a sub-component of said formatter.

4. A printer as defined by claim 1 wherein said memory module comprises a sub-component of said print engine module.

5. A printer as defined by claim 1 wherein said memory module comprises a sub-component of said user accessible control panel.

6. A printer having an embedded marking agent consumption rate test capability, the printer comprising:

a user accessible control panel having a plurality of controls for controlling the printer, said plurality of controls comprising at least a marking agent test page control;

a print engine module for producing a printed page from a formatted data file;

a formatter being linked to said print engine module, said formatter for formatting incoming unformatted print data files and transmitting formatted print data files to said print engine module for printing;

a memory module being linked to said print engine module via a linkage that bypasses said formatter, said memory module being linked to said marking agent test page control;

at least one test page data file stored in said memory module, said test page data file comprising instructions for printing of a marking agent test page; and a computer program product comprising computer executable instructions embedded in a computer readable medium, said computer program product being linked to said memory module, said computer program product for:

causing said memory module to accept a prompt from said marking agent test page control;

causing said memory module to retrieve said at least one marking agent test page data file after receiving said prompt;

causing said memory module to transmit said at least one marking agent test page data file to said print engine module via said linkage that bypasses said formatter for printing of said marking agent test page; whereby a marking agent consumption rate may be determined by measuring marking agent consumed in printing said marking agent test page.

7. A printer as defined by claim 6 wherein:

said at least a marking agent test page control comprises a first and a second marking agent test control;

said memory module is linked to each of said first and second marking agent test page controls;

said at least a marking agent test page data file comprises a first and a second marking agent test page data file stored in said memory module, said first marking agent test page data file for producing a first marking agent test page comprising black images, said second marking agent test page data file for producing a second marking agent test page comprising at least a color image;

and wherein said computer program product is further for:

causing said memory module to transmit said first marking agent test page data file to said print engine module via said linkage that bypasses said formatter after receipt of a prompt from said first test page marking agent control; and causing said memory module to transmit said second marking agent test data file to said print engine module via said linkage that bypasses said formatter after receipt of a prompt from said second marking agent test page control for printing of said second marking agent test page.

* * * * *